Nov. 19, 1935.  S. W. SPARKS  2,021,703
METHOD OF FORMING VALVE BODIES
Filed Jan. 3, 1931   11 Sheets-Sheet 1

INVENTOR:
Stanley W. Sparks,
BY
*M. Swearton*
*His* ATTORNEY

Fig. 5

Nov. 19, 1935.  S. W. SPARKS  2,021,703
METHOD OF FORMING VALVE BODIES
Filed Jan. 3, 1931  11 Sheets-Sheet 9

INVENTOR
Stanley W. Sparks
BY
His ATTORNEY.

Nov. 19, 1935.  S. W. SPARKS  2,021,703
METHOD OF FORMING VALVE BODIES
Filed Jan. 3, 1931  11 Sheets-Sheet 10

Nov. 19, 1935. S. W. SPARKS 2,021,703
METHOD OF FORMING VALVE BODIES
Filed Jan. 3, 1931 11 Sheets-Sheet 11

INVENTOR:
Stanley W. Sparks
BY
His ATTORNEY.

Patented Nov. 19, 1935

2,021,703

UNITED STATES PATENT OFFICE 2,021,703

METHOD OF FORMING VALVE BODIES

Stanley W. Sparks, Norwalk, Conn., assignor to Charles H. Bickell, trustee

Application January 3, 1931, Serial No. 506,509

5 Claims. (Cl. 29—157.1)

This invention relates to the production of irregular shapes by an extrusion operation and more particularly to those irregular right angles or other complicated shapes, such as valve bodies, and bonnets, pipe flanges and the like and has for its particular objects the economic and expeditious production of such shapes, from either ferrous or non-ferrous metals, by a cycle of operations upon a solid heated metal blank having substantially the same cubical content and weight as the finished shape. Furthermore, such shapes so produced are not only unusually light in weight, strong and durable but are preferably completely shaped both internally and externally in the cycle of operations. Moreover, the method herein described is of wide application and permits of the manufacture of forgings of varying sizes and shapes in the same die pot merely by varying the shape and size of the die plungers, the die block and liners which are employed in the cycle of operations performed on the blank or billet, besides other advantages hereinafter described.

In the accompanying drawings, in which I have illustrated different types of valve bodies including especially a valve body having integral hubs and flanges, and the various steps followed in the method of making such bodies, as well as the apparatus employed in connection therewith.

Referring now to the drawings and more particularly to Figs. 1 to 6, the apparatus comprises primarily a die-pot 10 adapted to be secured to a platen A of a standard vertical hydraulic press, split dies 11, 11', a ring 12 to carry the die elements, a ram 13 secured to the crosshead B of the hydraulic press and means hereinafter described for interlocking the die support or carrier ring 12 with the ram 13 to effect the raising and lowering of the dies 11, 11' with respect to die pot 10.

The die pot 10 is a heavy casting designed to withstand the high stresses and strains produced during the forging and extrusion operation and has its centre portion machined as at 14 and 15 to receive the dies 11, 11'. The lower portion 14 conforms to a truncated cone, being tapered to allow a quick "breaking" action between the dies and die pot and to firmly wedge the two halves of the dies 11, 11' together as the forming pressure is applied. The upper portion 15 of the hole is cylindrical. The bottom of the die pot has a flange 16 formed thereon whereby it may be secured to the platen A of the hydraulic press by the usual cap bolts and nuts.

It is necessary when the dies are lowered into the die pot that they be firmly positioned and locked therein so that misalignment will not occur with the high applied pressure and temperature involved in the operation. To this end the die pot is provided with a pair of locking pins 17 diametrically positioned in the upper portion 15 of the central hole and adapted to project into cooperating registering recesses 17' in the dies when the split dies are brought together and lowered into the die pot. To insure the recesses 17' being aligned with pins 17 so that the latter may enter same, the dies 11, 11' have keys 35 thereon which enter grooves 36 in the die pot as the dies are lowered into it.

The die lock pins 17 have reduced end portions 18 on which are screwed or otherwise secured forked members 19, the latter being pivotally attached at 20 to levers D, D' adapted to be manually operated which are pivotally mounted at 23 on brackets 21 carried by the die pot. The lock pins 17 are normally held in their inner or lock position by springs 22 loosely coiled about the stems 18 and abutting respectively on a shoulder on each pin 17 and on the inner face of brackets 21. Thus it will be seen that when the hand levers D, D' are pulled outwardly, the pins 17 will be retracted from the recesses 17' and unlock the die from the die pot.

Due to the hard service conditions of forging, it is desirable that the parts most subject to wear shall be removable. To this end the dies 11, 11' are provided with recesses 24, 24' wherein liners 25, 25' of especially resistant steel may be secured as by cap screws 27 set into counterbored holes 28 in the dies. Flanges 26 formed on the liners serve to properly and rigidly hold the same in vertical alignment.

A further purpose in the use of die liners is to allow objects of different forms to be made or to progressively form an object in successive steps without necessitating any extensive alterations of the machine. In the form of machine illustrated in the drawings, the liners 25, 25' are shown as shaped to form the first blank Y in the formation of a valve body M of a flanged gate valve.

Figure 5:
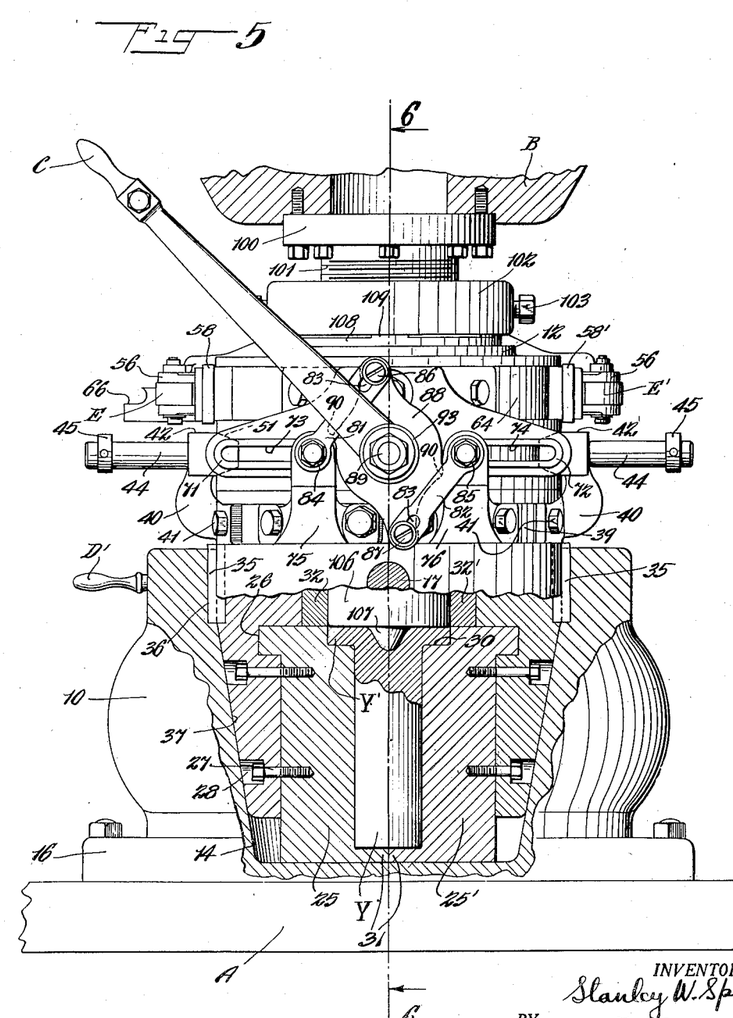
Figure 5 is a side elevation, partially in section, showing the end of the first forming stroke in the manufacture of a flanged valve body.
Figure 6:
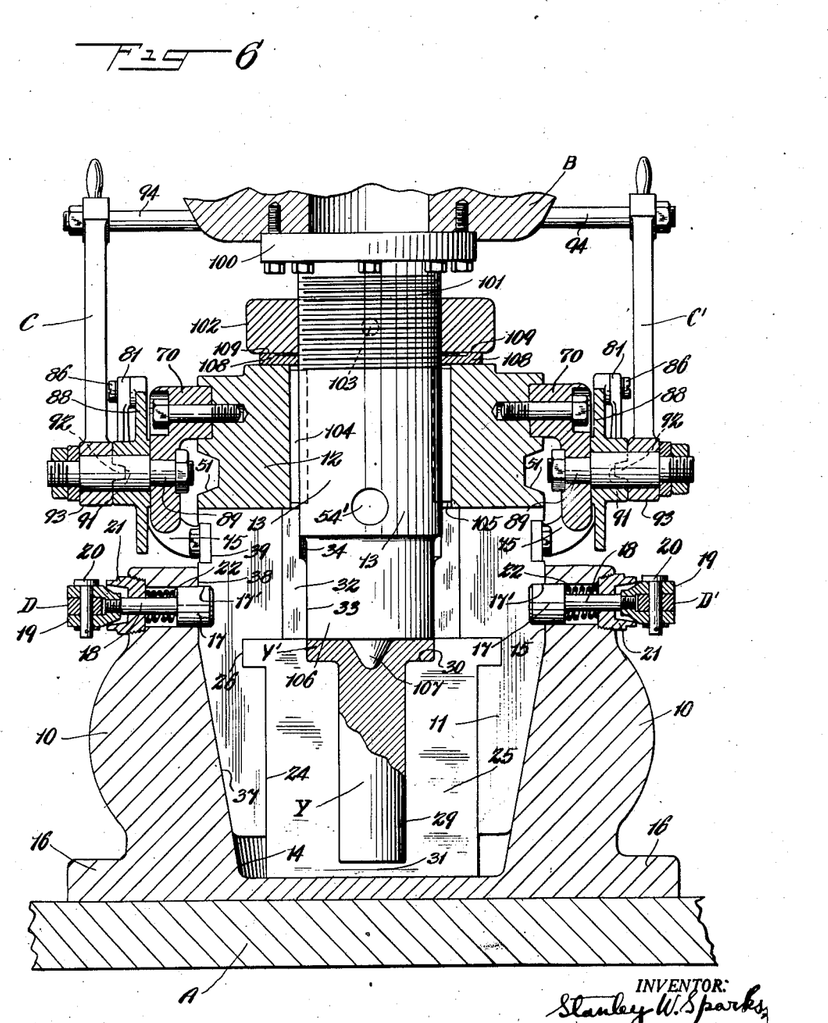
Figure 6 is a vertical section, partially in elevation, taken on line 6—6 of Fig. 5.

As shown in Figs. 5 and 6 each liner 25, 25' is provided with a semi-cylindrical cavity 29 closed at the lower end by a ledge 31 and having the top end shaped into a shoulder 30 to form, in conjunction with the shoulder in the opposite liner, one of the flanges Y' of the valve body M. The ledges 31 serve the double purpose of supporting the billet X and properly positioning it for the accurate formation of the flange Y'.

In using the form of liners whereby an uncompleted shape is forged it is understood that all of the billets of a run or heat are formed into blanks before removing and replacing the liners with those designed to produce the shape next in line toward the final desired shape. For instance, if the object to be forged can be made in three stages, such for example, as the valve body of Figs. 16 to 18, all the billets of a run may be successively heated and run through the machine to be formed into the first blank, after which the dies are cooled and the liners changed. All of these blanks are then heated and run through the machine to form the second blank. The liners are again changed, the second blanks are heated and again run through the machine to receive their final form.

Provision is made so that as the work varies or the sizes of the objects change various sized rams may be used without extensively changing the body of the machine. This is accomplished by providing split guide bushings, each half of which is secured by screws in the halves 11, 11' of the split die. In Figs. 1 to 9 the guide bushing halves 32, 32' are shown with a small inside diameter 33 and a larger inside diameter 34 above it, the latter diameter 34 representing the maximum ram diameter for which the machine illustrated is adapted. In Figs. 11 to 14 split bushings 138, 138' are shown as having replaced bushings 32, 32' to allow a different ram 139 to be used.

Referring now to the construction of the die and the means for supporting and guiding same in its movements, the two halves 11, 11' of the split die are shaped externally to fit snugly and securely within the holes 14, 15 in the die pot, the taper portion 37 contacting with the taper hole 14 and the upper straight portion 38 fitting within the straight part 15 of the die pot. In the extreme upper periphery of each die half 11, 11' there is formed an annular groove 39 into which is seated a goose-necked support bracket 40, it being held therein by screws 41. The bracket 40 is provided with a laterally extending arcuate boss 42 on its upper part, which has an inwardly projecting tapered portion 43 that is adapted to cooperate with a similarly tapered annular groove 51 in the main die support ring 12 and thereby assist in the proper positioning of the die halves when the same are closed together prior to being lowered into the die pot.

Each die half is slidably supported for lateral movement beneath the ring 12 by the bracket 40, which rides on a stud 44 screwed into the ring, and two forked brackets 75, 76 which are fastened in groove 39 similar to bracket 40. A collar 45 on each stud 44 marks the limit of the outward movement of the dies at a point where the opening between the dies is large enough to withdraw the largest object to be made.

The forked brackets 75, 76 are slidably hung upon laterally extending arms 71, 72 of two depending support members 70 diametrically secured in a groove 64 in the upper part of ring 12. Slots 73, 74 in arms 71, 72 serve as guides and runways for the rollers 79, 80 mounted on studs 77, 78 carried in the tines of the forked brackets 75, 76. Thus it will be seen that each die half 11, 11' is hung from three widely separated points and is accurately guided in a limited lateral movement towards or away from the other die half.

The main support ring 12 is at all times centrally aligned and controlled in its movements by the ram 13 (or 139) sliding in a central aperture 52 in the ring. The ring 12 and ram 13 are kept in alignment by keys 104 on the ram and coacting keyways 105 in the ring.

For raising and lowering the dies in relation to the die pot the movement of the hydraulic ram is utilized by manually locking and unlocking the dies to the ram at desired points of ram travel. As embodied in the machine, this is accomplished by the cooperation of two inwardly projecting lock-pins 53, 53' carried by the ring 12 and two diametrically positioned holes 54, 54' in the ram 13 (or 139). The holes in the ram are so positioned that when the ring 12 and dies 11, 11' are locked thereto by pins 53, 53' the lower end of the ram is sufficiently above the dies to clear the upper end of any billet to be used in the machine. The lock pins 53, 53' are manually operable by a hand lever E' and are interconnected for the purpose as follows: the pins have reduced stem portions 55, which project outwardly through ring 12 and fulcrum brackets 58, 58' and to these stems yoked members 56 are secured to form a pivotal connection 57 with levers E, E'. The pins are normally urged to locked position by springs 59 loosely coiled about stems 55 and abutting on the pins and the inner faces of the fulcrum brackets 58, 58'.

The pin 53' is directly operable by hand lever E' as it is swung inwardly (Fig. 3) about its pivot 61', the latter being carried by the extending fork 60' on fulcrum bracket 58'. The pin 53 is retracted by lever E which is pivoted at 61 on arms 60 of bracket 58. Lever E is connected to hand lever E' by a link or rod 62 so that by moving the hand lever E' both lock pins are retracted. Due to the fulcrum points on the two levers E, E' being in different positions relative to the lock pins (to give opposite directional movements to the pins), the distance which the handle end of lever E' travels in retracting the pin 53' is greater than that traveled by the lever E in retracting its pin 53. It is desirable that the movement of the two pins be substantially the same and to accomplish this the rod 62 is attached to lever E' by a bolt and slot connection 63. The slot is of such a length as to allow the proper amount of excess movement to hand lever E' which the position of its fulcrum necessitates.

To enable the pins 53, 53' to be held in the open or unlocked position a latch member 65 is mounted in the groove 64 of ring 12 in such a manner that the end 66 with notch 66' is in the path of travel of hand lever E'. The hand lever when in full open position drops into the notch 66' and thus holds the pins in retracted position until the hand lever is released from the notch by the operator, at which time the springs 59 will return the parts to their locked positions.

When the dies 11, 11' are withdrawn from the die pot by the upward movement of the ram it is necessary to "break" or "split" them and move them laterally away from each other to remove the forging therefrom and insert the next billet.

Since the method by which the dies were supported from the ram to allow for this lateral movement has already been described, it now remains to describe the mechanism by which the movement is accomplished. This comprises an arrangement of toggle levers wherein the maximum force of the toggle is exerted when the dies have to be "broken" from their "frozen" closed position. Since such mechanism, which is adapted for manual operation, is duplicated on each side of the machine, a description of one side only is therefore deemed sufficient. As embodied, the mechanism comprises a toggle lever 81 pivotally secured to the outer side of the forked bracket 75 upon an extension of the roller stud 77. A retaining collar 84 is provided to hold the lever in place. A second toggle lever 82 is similarly attached to an extension of roller stud 78 which is carried by forked bracket 76 on the die 11'. A retaining collar 85 serves to hold lever 82 in place on stud 78.

The two levers 81, 82 are pivotally attached as by studs 86, 87 respectively, to a disc 88 which forms the third member of the toggle system. The disc 88 is rotatably mounted on a stud 89 centrally carried by the depending support brackets 70 on the ring 12 and has two notches 91 oppositely positioned on the face of the hub which is formed thereon. Two teeth 92, which project from the inner face of the boss 93 on the hand levers C', mesh with notches 91 on disc 88 and lock the lever C to the disc 88 so that movement of levers C and C' from the position shown in Fig. 5 will, when the dies are withdrawn from the die pot, rotate the disc 88 and through the levers 81, 82 serve to propel the forked brackets 75, 76 outwardly along slots 73, 74 and with them the die halves 11, 11'. To insure the levers C and C' acting in unison a cross bar 94 is rigidly secured to each.

At certain times the dies may become difficult to separate or "break" apart due to vacuum action or sticking of the forging to the dies, in which case a sharp blow serves to accomplish the "break". This blow can be imparted, in the apparatus illustrated, by an initial quick movement of levers C, C' acting through two cam risers 90 on the periphery of toggle disc 88, since the cams 90 are in a position to immediately strike with some force the forked brakets 75, 76 at this initial movement. The toggle levers 81, 82 have slots 83 in their ends adjacent the disc 88 to allow for the full play of the sudden impact action of disc and brackets.

The ram used in the machine is preferably interchangeable to allow those of different sizes and shapes to be substituted as various sized and shaped articles are to be produced. The ram may be generally considered as being in two parts, the upper or guiding and securing end and the lower or forging end. It is the latter or forging end wherein the rams differ. As illustrated in the drawings, the upper end of the ram consists of a main shank section 13, a flange 100 at its upper end for use in bolting it to the cross-head B and a threaded portion 101 upon which a collar 102 may be adjustably positioned by set screws 103 to limit the downward forging stroke of the ram. The keys 104 on the ram slide in keyways 105 in ring 12 and serve to keep the two members in proper alignment. The construction of the ram as described thus far is common to all the rams which may be used in the machine as illustrated.

The lower or forging end of the ram may be of any size or shape within the capacity of the machine and, as shown, in Figs. 1 to 9 comprises a reduced portion 106, the outside diameter of which corresponds to the outside diameter of the flanges Y' and Z' of the valve body M. A piercing boss 107 projects from the center of the lower end and serves to give the initial flaring or bull-dozing action on the billet or blank.

The downward movement of the ram during the forging portion of its stroke is limited by the collar 102 striking pads 109 on a spacing washer 108 carried on the top surface of ring 12. The spacing washers are machined within course limits to the desired size for each article of manufacture, the fine adjustment being accomplished by screwing collar 102 up or down on the ram.

Figure 16:
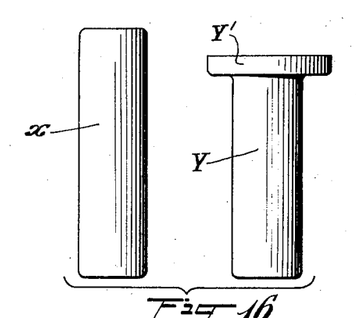
Figure 16 is a side elevation of both the billet and also the formed blank obtained after the first operation.
Figure 17:
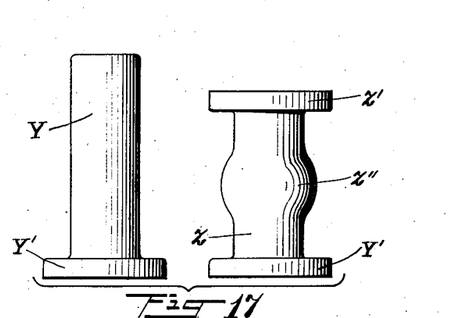
Figure 17 is a side elevation both of the formed blank, in the position it is placed in the die and also of the corresponding shape obtained after the second operation.
Figure 18:
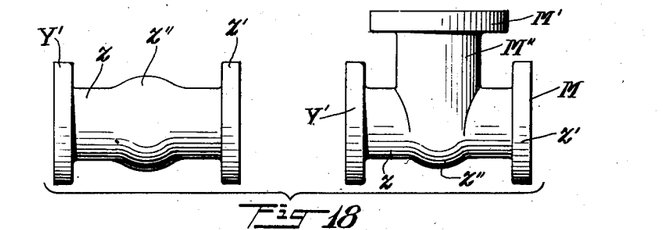
Figure 18 is a side elevation both of the blank formed by the second operation and also of the final form obtained after the third operation.
Figure 19:
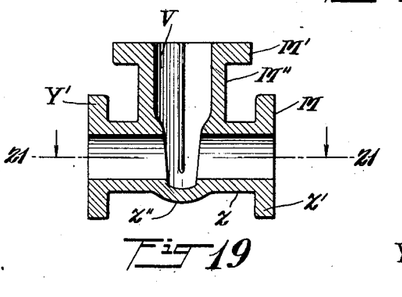
Figure 19 is a vertical cross section of a valve body after the fluid-way thereof has been machined or pierced.
Figure 20:
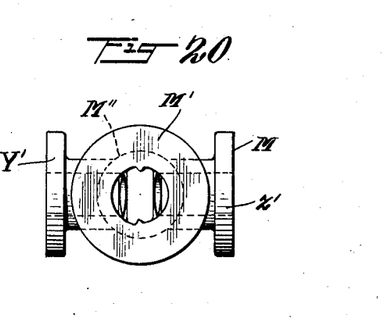
Figure 20 is a plan view of the completed valve body.
Figure 21:
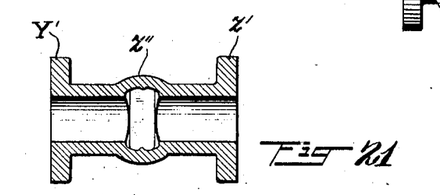
Figure 21 is a section on the line 21—21 of Fig. 19.
Figure 22:
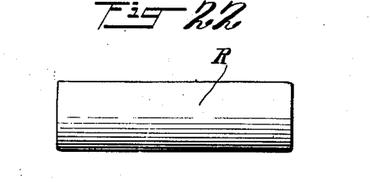
Figure 22 is a side elevation of a billet used in producing a valve body of the screwed-on flanges or screwed-end type.
Figure 23:
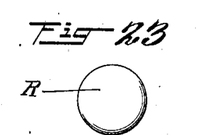
Figure 23 is an end view of Fig. 22.
Figure 24:
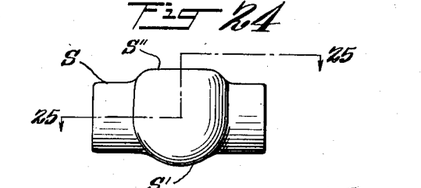
Figure 24 is a side elevation of the blank shown in Fig. 22 after the first operation.
Figure 25:
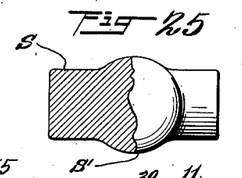
Figure 25 is a plan view partially broken away, of the blank shown in Fig. 22 partly broken away.
Figure 26:
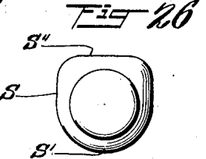
Figure 26 is an end view of Fig. 24.

In the formation of the valve body M, as illustrated in Fig. 18, three steps or operations are required, the shapes given to the billet and blank after each step as well as their position in the machine at the beginning and end of each operation being shown in Figs. 16 to 18. In Fig. 16 the billet X is cylindrical and placed vertically in the die liners 25 and 25' to be forged into the blank Y with a flange Y' formed on its upper end.

Figure 7:
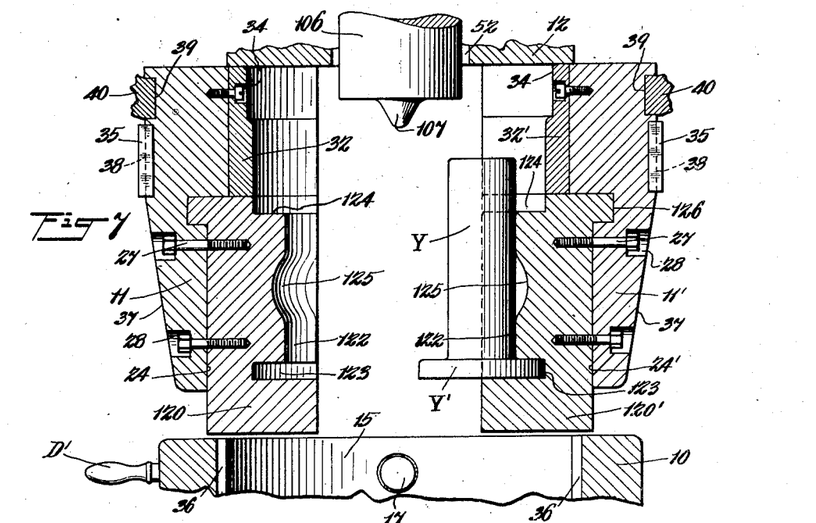
Figure 7 is a vertical cross section of the dies in revised and expanded position but equipped with a different set of die liners and showing the blank from the previous operation placed therein ready for the second step in the forming of a valve body.
Figure 8:
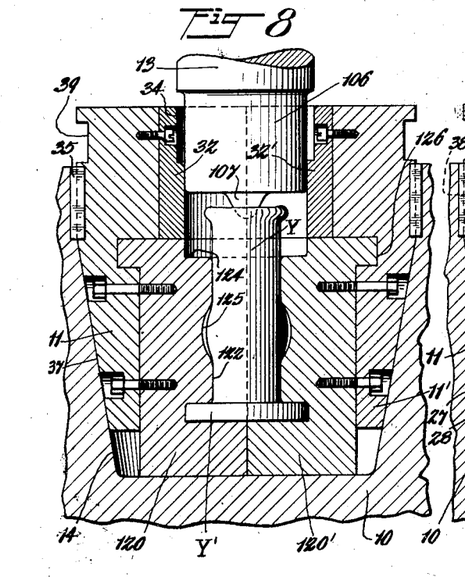
Figure 8 is a view similar to Fig. 7 but showing the die encased within the die pot and the ram partially descended, the blank being correspondingly acted upon.
Figure 9:
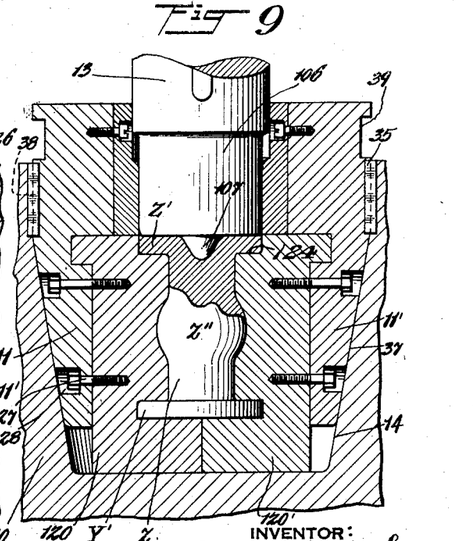
Figure 9 is a view similar to Fig. 8 but showing the ram fully descended and the blank formed thereby ready for the finishing operation.
Figure 10:
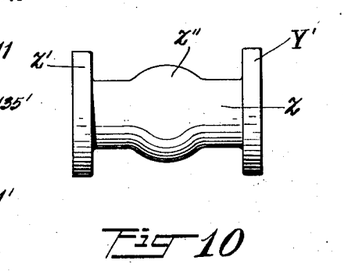
Figure 10 is a side elevation of the formed blank as it appears after the second operation.
Figure 11:
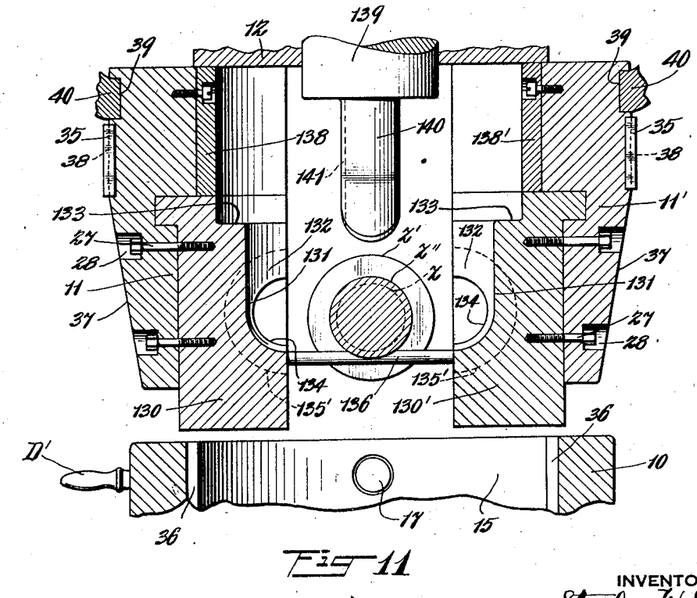
Figure 11 is a vertical section, partially in elevation, of the dies in raised and expanded position showing die liners adapted to receive the blank shown in Fig. 10 and form it into the final valve body shape.
Figures 12, 13:
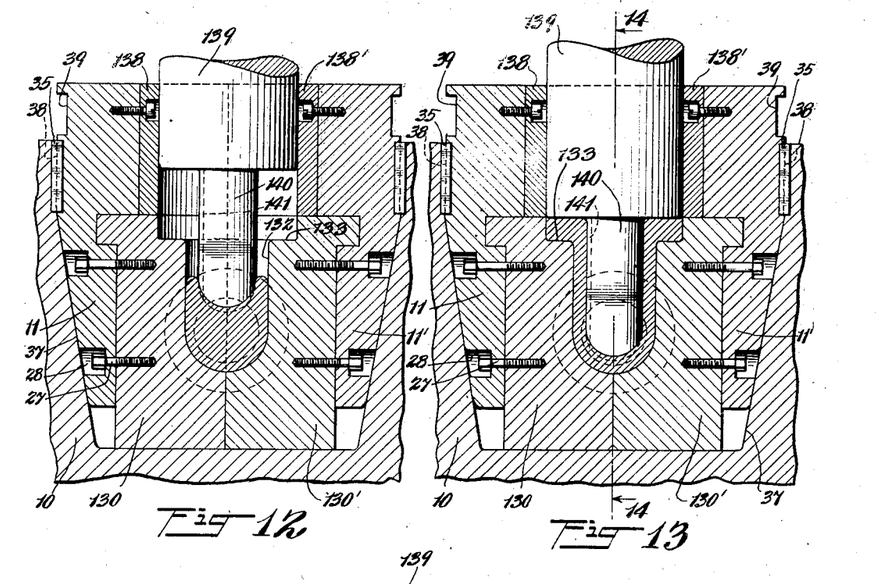
Figure 12 is a view similar to Fig. 11 but showing the die closed and encased within the die pot at an intermediate stage of the extrusion operation.
Figure 13 is a view similar to Fig. 12 but showing the end of the extrusion stroke of the ram.
Figure 14:
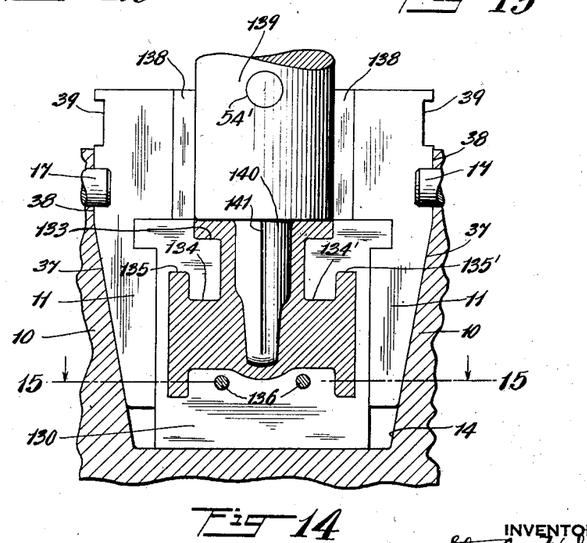
Figure 14 is a section taken on line 14—14 of Fig. 13.

In the second operation, die liners 25, 25' have been removed and replaced by liners 120, 120' (see Figs. 7, 8, 9). Each of these liners has a cavity 122 therein to receive the blank Y. A recess 123 at the lower end of the cavity 122 accommodates the flange Y' of the blank and a shoulder 124 in the upper end provides the form to produce the flange Z' of the second blank Z. A depression 125 in the central portion of cavity 122 serves to give the external shape or bulge Z'' to that portion of the blank wherein the gate chamber is to be made.

The external shape of liners 120, 120' is of course the same as that of liners 25, 25', the flange 126 corresponding exactly to flange 26 and screws 27 serving to hold the liners similarly in place. Fig. 8 shows an intermediate position of the forging stroke with the blank Y starting its change of shape into blank Z, depression 125 being partially filled and the upper end bull-dozed outwardly on its way to become the flange Z'. Fig. 9 shows the end of the stroke to form the blank Z.

The next and final operation in which the blank Z is reshaped to form the gate chamber V and bonnet flange M' is shown in Figs. 11 to 15. In this step, liners 130, 130' are used wherein the cavity 131 has a vertical semi-cylindrical portion 132 for forming the gate chamber member M'' and a shoulder 133 at the top to form the flange M' to which the bonnet of the valve is to be bolted. Extending laterally from the portion 132 are two horizontal semi-cylindrical depressions 134, 134' at the end of which are recesses 135, 135' for receiving flanges Y' and Z' of the blank Z.

Figure 15:
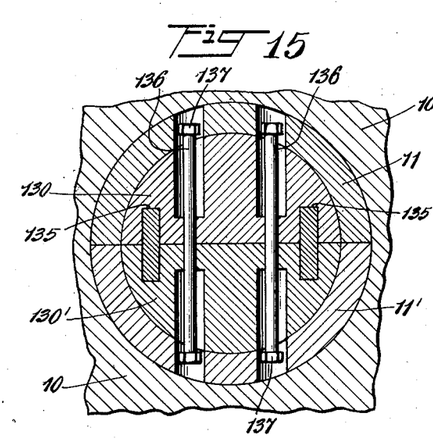
Figure 15 is a section taken on line 15—15 of Fig. 14.

In placing the blank Z within the opened dies for the third operation, it is necessary to provide means for supporting it in a position to be received in the cavity 131 as the dies are closed. This support comprises two rods 136 carried by both liners 130, 130' in such a manner that the opening and closing of the dies is not interfered with. This is accomplished by making the rods long enough to allow full opening of the dies and then telescoping them within deep holes in the liners and dies as the dies close (Fig. 15). Nuts 137 on each end of the rods 136 prevent them from being displaced.

In use the blank Z is placed on the rods 136 so that the flanges Y' and Z' are in position to enter recesses 135, 135'. The location of the rods is such as to automatically accomplish this in that the rods just span the enlarged portion Z'' of the blank and bring the flanges opposite the recesses.

The third operation involves the use of a different ram from that in the first and second. In this form the ram has a forging end 139 similar to the end 106 on ram 13 but of a larger size to form bonnet flange M'. A forming end 140 having the same shape as the gate chamber V is carried on the ram 139 and when said end 140 is forced into the large center part Z'' of the blank Z it extrudes the metal upwardly about itself and against the shoulder on ram 139. The latter, as it descends, then by a bull-dozing or upsetting action flares the metal over the shoulders 133 and forms the bonnet flange M'. Two grooves 141 on the end 140 form guide fins in the valve body for the gate when the valve is assembled. Thus is completed the formation of a forged and extruded valve body for a gate valve, with the gate chamber, wall thicknesses, and flanges accurately shaped and sized, leaving only the flange facing and drilling and fluid-way boring to be done by other machines.

In Figs. 22 to 29 is shown a form of billet, blank and die liners whereby a valve body without integral fluid-way flanges may be made. A cylindrical billet R of proper weight and size is formed, either in the machine illustrated (but with different liners, not shown) or otherwise, into the blank S shown in Figs. 24, 25, 26 wherein the enlarged center portion S' is utilized to make the gate chamber and bonnet flange.

Figure 27:
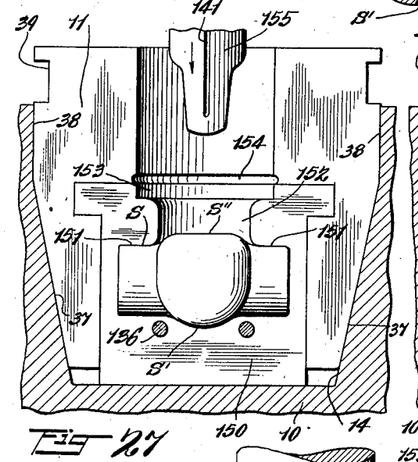
Figure 27 is a vertical section of the die in closed position showing the blank of Fig. 24 in position in the die liners ready for extrusion into the final valve body shape.
Figure 28:
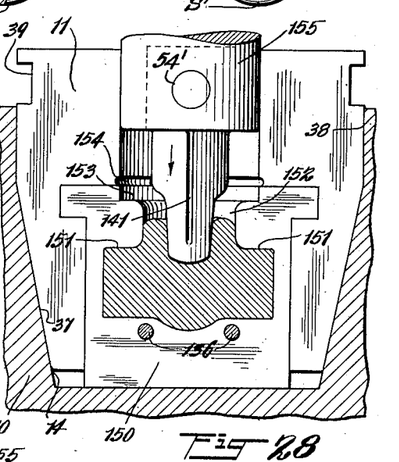
Figure 28 is a view similar to Fig. 27 but shows the ram partly descended and extrusion of the metal taking place.
Figure 29:
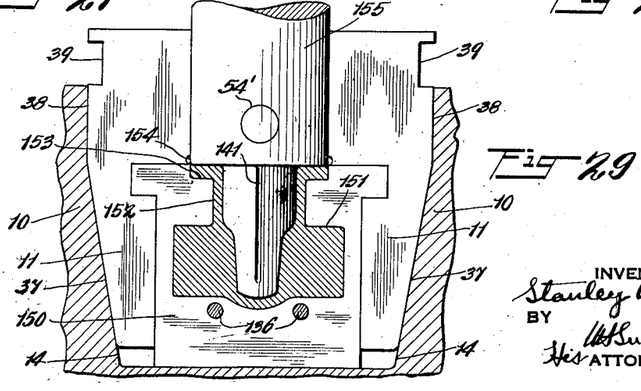
Figure 29 is a view similar to Fig. 27 but shows the completion of the extrusion stroke.
Figure 30:
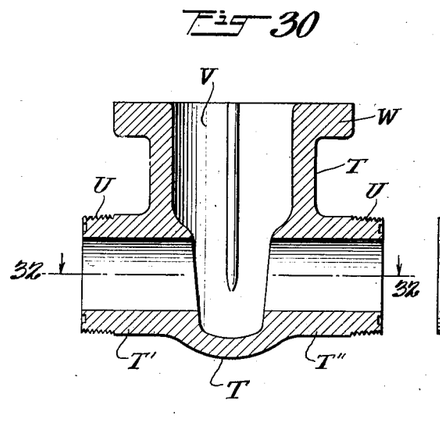
Figure 30 is an enlarged vertical cross section of the valve body shown in Fig. 29 with the fluidways therein and the hubs threaded and faced ready to receive the flanges.
Figure 31:
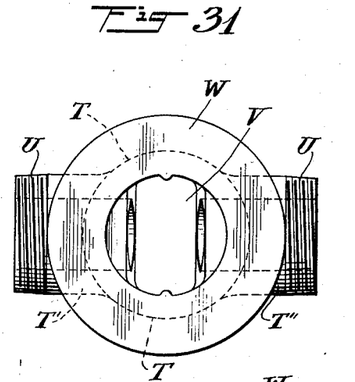
Figure 31 is a plan view of the valve body shown in Fig. 30.
Figure 32:
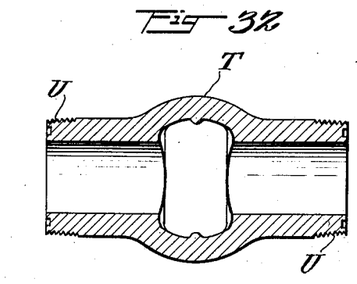
Figure 32 is a section taken on line 32—32 of Fig. 30.
Figure 33:
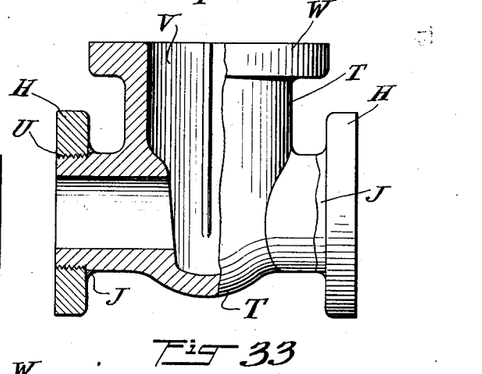
Figure 33 is a side elevation partly in section of the valve body with the applied flanges attached thereto.

The last operation or step illustrated in Figs. 27, 28, 29, shows die liners 150, with a horizontal semi-cylindrical cavity 151, a vertical cavity 152, a flange forming shoulder 153 and an appropriately shaped ram 155. A groove 154 formed in the die above the liner serves to receive any excess metal over that necessary for making the valve body.

In Figs. 30 to 33 is shown the manner in which manner flanges, H, H are applied and secured on the valve body T as produced by die liners 150. The hubs T, T' are threaded as at U and the flanges H, H screwed thereon and welded, as at J, to form a practically integral hub and flange. The upper or bonnet flange W is, of course, formed integral with the valve body in the shoulders 153.

Figure 34:
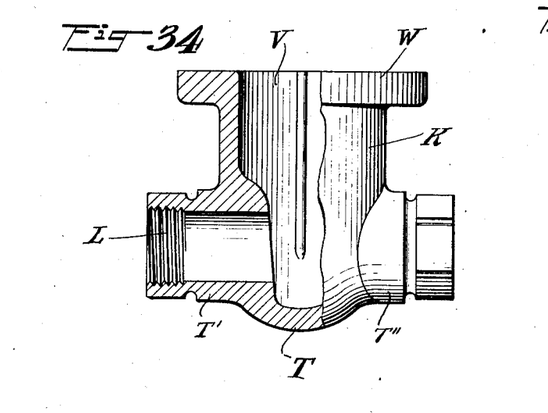
Figure 34 is a side elevation partly in section of another form of valve body which is made in the die by using appropriate die liners.

Fig. 34 shows still another form of valve body K wherein instead of providing flanges H, threads L are formed on the interiors of the hubs to make a so-called screw-end valve body.

Figure 1:
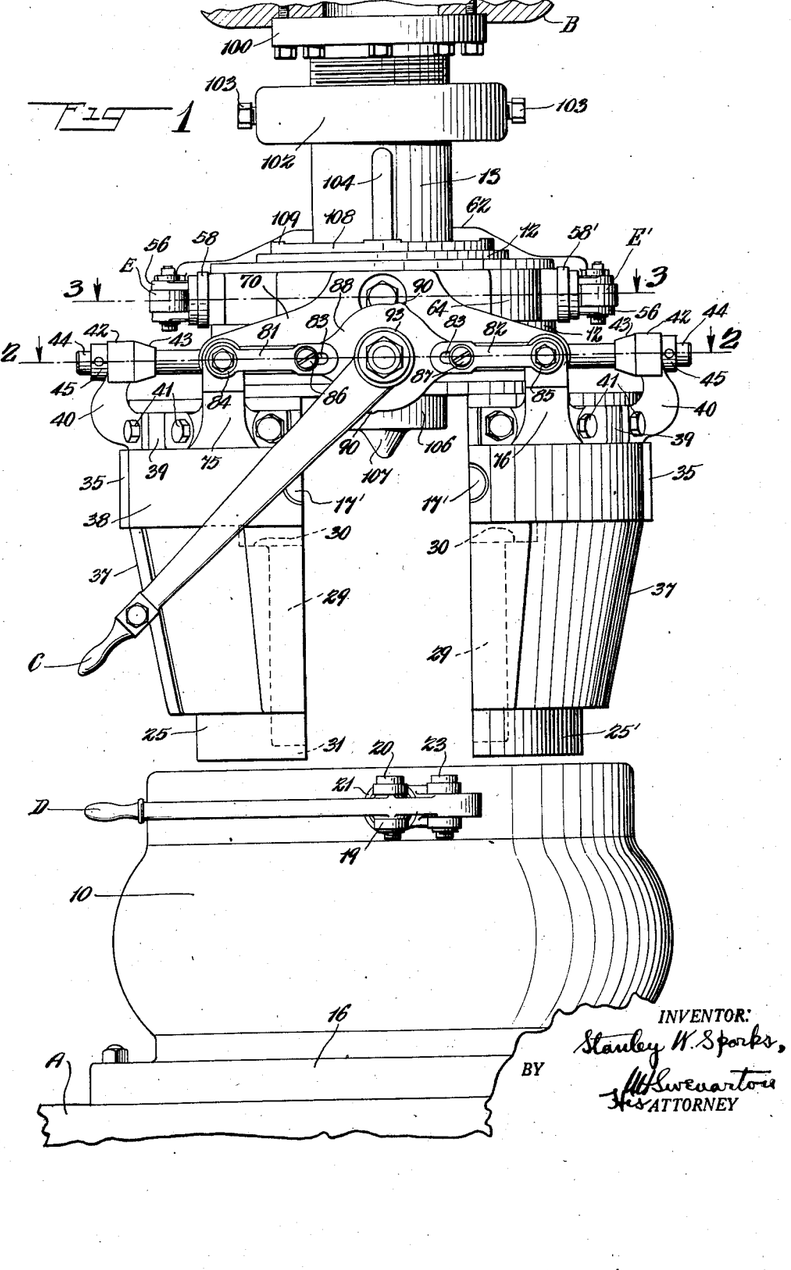
Figure 1 is a front elevation of my improved extrusion apparatus showing the die elevated above the die-pot and opened for charging.
Figure 2:
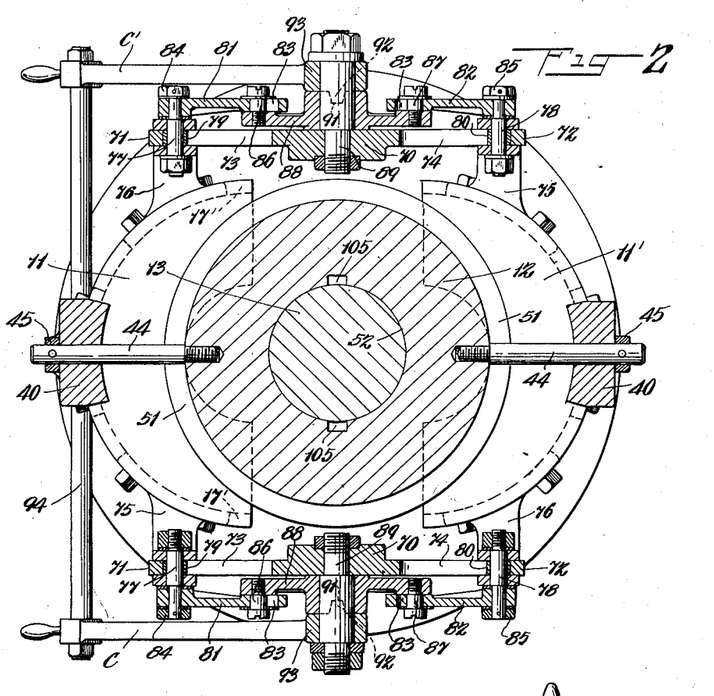
Figure 2 is a section taken on the line 2—2 of Fig. 1.
Figure 3:
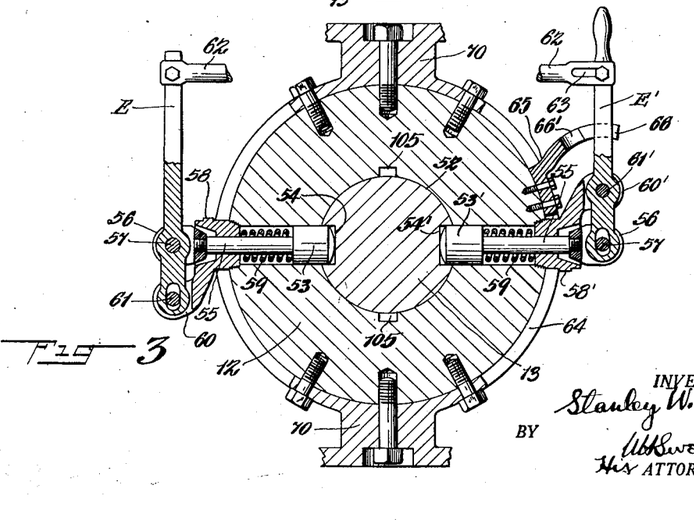
Figure 3 is a section taken on the line 3—3 of Fig. 1.
Figure 4:
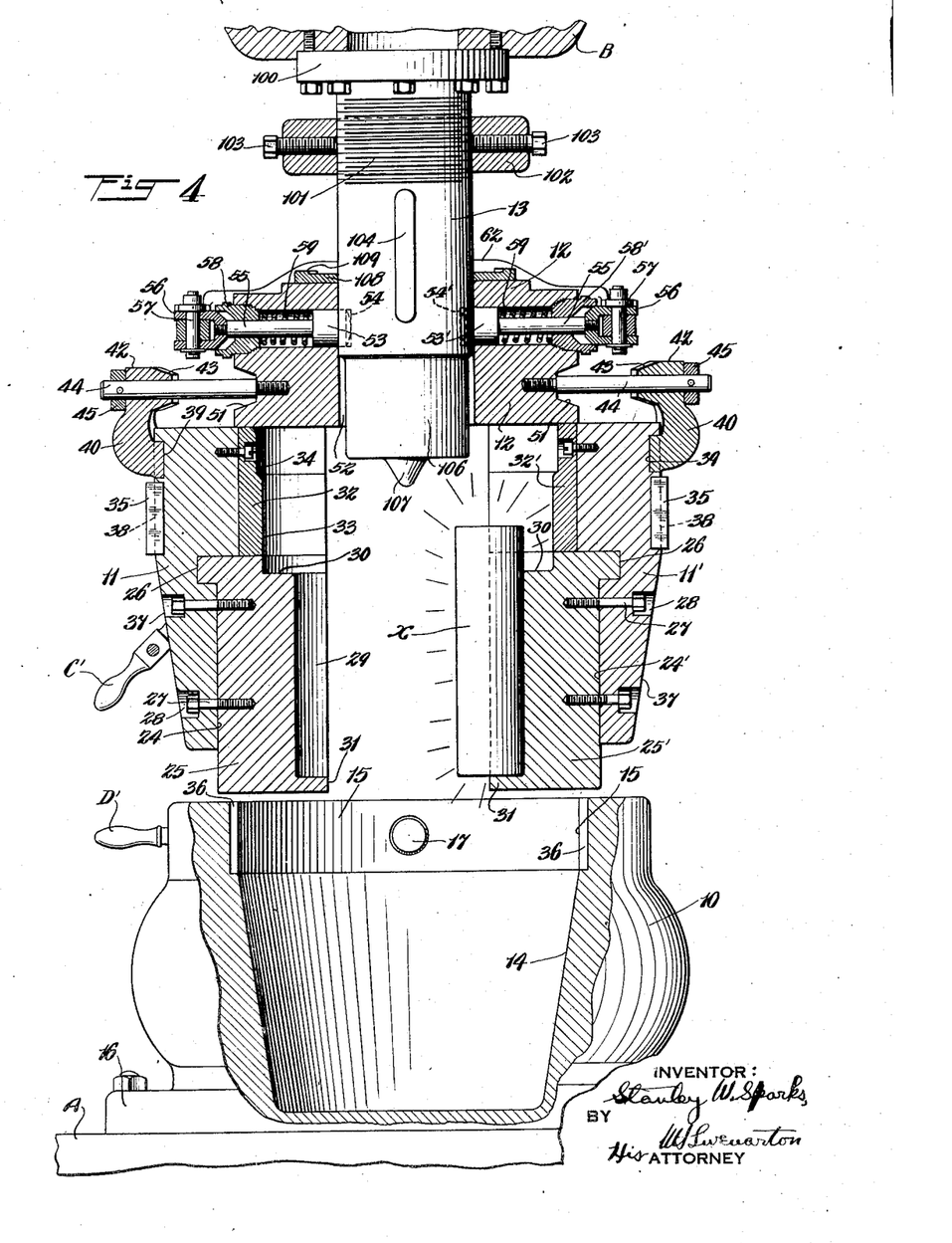
Figure 4 is a vertical section, partially in elevation, of the apparatus with the parts in the same position as shown in Fig. 1, but showing a billet in place ready for the first operation.

The operation of the machine will now be described starting from the position shown in Fig. 1 wherein the dies are out of the die pot and separated from each other, with the entire mechanism, except the die pot, hanging on the ram. A billet X, cylindrical in shape and having the correct volume of metal, is heated to a temperature between 2250° F. and 2350° F., which produces in the steel a plastic condition highly suitable for extruding and forging. The furnace for heating the billets should of course be situated in close proximity to the machine to facilitate speed of handling with the smallest heat loss possible. The billet is taken from the furnace by tongs slung from a traveling crane and inserted between the dies in an upright position with its bottom resting on one of the ledges 31 on the liners. The billet then occupies the entire cavity 29 and projects above it in sufficient volume to allow for the formation of the first flange. With the tongs still holding the billet lightly in place in one of the dies, the handle C is moved upwardly and forces the two die halves together. At the same time the tongs are withdrawn and the die halves meet and form a complete die with the billet within, ready for forging.

It will be noted that when the dies have been closed the billet is within a closed, substantially air tight compartment with the ledges 31 sealing the bottom and the ram sealing the top openings. This exclusion of air from the die cavity prevents to a very large extent, if not entirely, the formation of any more scale than was acquired by the billet during its transfer from the furnace to the dies.

The die is then lowered into the die pot by gravity by releasing the fluid pressure in the drawback cylinders (not shown) and dropping the cross-heads B and ram to a position where the dies seat themselves in the die pot. During such downward movement the taper 37 on the dies strikes the two lock pins 17 in the die pot and retracts them into their respective recesses and against their springs until, as the die seats itself, the cooperating holes 17' on the dies register with the pins and the pins snap into the holes. The die is then locked against all movement in the die pot and is ready for the forging stroke.

At this point the hydraulic ram must be released from the die supporting ring 12. The operator, to accomplish this, moves the hand lever E' inwardly to withdraw the pins 53, 53' from the ram and continues the movement until the lever drops into the latch 66' to hold the pins out. The ram is then free to perform the work upon the billet either in short reciprocating strokes as a sort of bull-dozing or upsetting action or as a single powerful extruding and forging stroke. When the operator observes the collar 102 in contact with the washer 108, he knows that the forming operation is completed and then releases the hand lever E' from the latch. This allows pins 53, 53' to bear against the ram. The die locking handles D, D' are then moved outwardly to unlock the dies from the die pot and the valves on the machine (not shown) set for the upward stroke of the ram which is accomplished in the well known manner by steam or air draw-back cylinders (not shown). The power is then applied, thru the said draw-back cylinders, to raise the ram, with the result that as the holes 54, 54' in the ram register with the pins 53, 53' the latter drop into said holes and the ring 12 becomes locked to the ram and rises with it, carrying as it does so, the dies.

As soon as the bottom of the die is clear of the die pot, the handle C is forcibly thrust downwardly to break open the dies and move them apart. This action exposes to view the finished blank which is "frozen" or adhering to either of the die halves. The tongs are then brought into play to first loosen the blank from the liner and then remove it, leaving the die ready for the next billet and cycle of operations. The machine is operated in the above manner until all of the billets of a given lot have been converted into the first blank.

The machine is now allowed to cool off to a point where the die liners may be removed and the liners for the second operation are substituted and bolted in place. The blanks Y are now run into the furnace and heated to the proper forging and extruding temperature and then run through the machine in exactly the same cycle of operations as described for the first operation until the entire lot has been converted into the second blank Z with two flanges and an enlarged or swollen center portion.

The dies are now allowed to cool again and the third set of liners is then substituted and bolted in place. The third operation, which involves the formation of a valve chamber and bonnet flange, necessitates the use of a different ram and ram guide bushing. The ram 13 with forming end 106 is unbolted from the cross-head and ram 139 bolted in place. The forming end 140 of this ram, as hereinbefore explained, forms the interior of the valve chamber. The bonnet flange, in the example shown for illustration, is larger than the fluid-way flanges, and this requires that the end of the ram 139 be larger than the part 106 on ram 13. This of course requires a change in the bushings.

The third operation is essentially the same as the first two except that in this the blank Z is placed horizontally on two support bars 136 which telescope within the dies as they close. At the end of the forging stroke, the die and die pot are unlocked, as previously described, and the ram raised until the ring 12 automatically locks itself thereon. The position at which this takes place is such that the portion 140 on the ram has not been entirely withdrawn from the just formed valve chamber and it is due to this that the portion 140 serves to "break" the valve body from its adherence to either of the die halves as the latter open. The valve body then drops upon the bars 136 and is removed by the tongs and the machine is ready for the next blank. From the foregoing it will be seen that a machine is provided for making valve bodies and similar parts which is fast and accurate and only requires the labor of relatively unskilled operatives. It is also designed for being quickly adapted to manufacture any of a large variety of objects with a minimum amount of alteration or part changing.

The temperature to which the billet is primarily heated prior to the first or flange-upsetting operation need not necessarily be an extrusion temperature but merely a forging temperature, say from 1900° F. to 2300° F., especially if such flange is formed by a series of impact blows such as in a bull-dozing operation. Moreover in the extrusion of the bulge in the blank it is merely necessary that the central portion only of the blank from which metal is to be extruded be heated to an extrusion temperature of say 2250° F. to 2350° F.

The cubical content of the metal billet employed should, except for a small allowance for fins, be equal to that of the finished valve body obtained after the completion of the extrusion of the body and body flange from the central bulge as, for example, the body shown in Figs. 18 or 29.

Both the rams and the die may be fluid cooled in any well-known manner to prevent excessive heating thereof.

Since the flanges are formed by an upsetting or flaring of the metal of the blank over the shoulders of the liners, few if any rejects result as would be the case were it attempted to extrude the metal into the small flange forming recesses of a die and said flanges are sharply defined and of dense homogeneous texture and free from blow holes and other defects.

The ram pressures employed vary according to the stage of the operation, i. e. whether a mere upsetting or flaring operation as in the first operation or an extrusion operation as in the case of the extrusion of the metal of the bulge into a body and body flange. In the bull-dozing or upsetting operation lower pressures may be employed, if the same is accomplished by repeated impacts rather than by a continuous pressure of a ram and on the other hand the lower the temperature of the metal the higher will be the pressure required. About 25,000 lbs. per square inch is desirable as the ram pressure in the extrusion operation where operating on ordinary forging steel and various alloys when the same is in a plastic condition.

In processing a heated metal blank into a valve body, as illustrated in the drawings, all of the different operations are the same whether operating on ferrous or non-ferrous metals, such as steel, iron, wrought iron, brass, or copper alloys for example, but the temperatures and pressures required to cause the metal to flow into the shape desired vary according to the character of the metal in the blank.

The purpose of describing the aforesaid operations on ferrous metals in complete detail is to disclose a rapidly performed sequence of mechanical movements which are accomplished in a unitary apparatus, together with a process of flowing metal into irregular and complex shapes by the use of applied high pressures to the forging ram in order to force the plastic metal into the die cavities, at all stages of which operation there is a complete balancing of the angularly applied pressures and thereby any destructive action on the physical structure of the heated metal while it is in a plastic state is prevented.

The temperatures employed in operating upon different metals should be such that the metal is plastic during the extrusion operation, that is, considerably above a rolling temperature, but below the temperature at which the metal becomes viscid, i. e. the temperature at which the metal if deformed, will re-form itself as contradistinguished from the action of plastic metal and in the case of steel, the preferred temperature is in excess of 2250° F. and not over 2400° F.

Various changes from the construction and method of operation herein disclosed may be made without departing from the spirit of my invention as embraced within certain of the appended claims.

Having thus described my invention, I claim:

1. The method of forming a multi-way valve body, which comprises subjecting an elongated, substantially cylindrical metal blank of the cubical content of the desired valve body while heated to a forging temperature and while confined in dies conforming in their internal contour to the external contour of an intermediate shape desired, to an upsetting action of a power operated ram until a terminal flange is formed on said blank, then removing said partially formed blank from the die, again confining the same in a different set of dies of a configuration generally conforming in internal contour to the external contour of the hub portions of the finished shape including flanges for such hub portions and subjecting such partially formed blank to a second upsetting action while heated to a plastic condition, to form an opposing flange on the opposite end thereof and a centrally bulged portion, then removing such partially formed blank from the dies, heating said bulged portion to an extrusion temperature and a plastic condition, again confining the same in a still different set of dies of an internal configuration conforming to the exact external shape of the desired valve body and therein subjecting such partially formed blank to the action of the forming end of a ram whose external configuration corresponds to the exact internal configuration of the valve chamber and simultaneously extruding the metal from the central bulged portion in a direction counter to that of the applied pressure and around said plunger to a distance beyond the outermost limits of the ultimate location of the body flange to be formed on said valve body and then by a continuation of the pressure stroke upsetting a terminal body flange on said valve body.

2. In the method of forming multi-way valve bodies, the steps which comprise subjecting an elongated substantially cylindrical metal blank of a cubical content equal to the finished valve body desired, while the central portion thereof is heated to an extrusion temperature and in a plastic condition and while confined within dies of a configuration generally conforming in internal contour at the bottom thereof to the external contour of the hub portions of the desired valve body, to an upsetting action of a power operated ram and thereby forming a central bulged portion and opposing hubs, then removing said modified blank from the dies, reheating the same to an extrusion temperature and a plastic condition, again confining the same in a different set of dies of an internal configuration corresponding to the external configuration of the valve body to be extruded and subjecting such modified blank therein to the forming action of a ram, the external configuration of whose forming end corresponds to the internal shape of the desired valve chamber and extruding the metal from the central bulged portion, in a direction counter to that of the applied pressure and around said forming ram, to a distance beyond the outermost limits of the ultimate location of the body flange to be formed and then by a continuing pressure stroke of said ram upsetting a terminal body flange on said valve body.

3. In the method of forming a valve body, the steps which comprise subjecting an elongated, substantially cylindrical metal billet, of the cubical content of the desired valve body, while the central portion is heated to a plastic condition and while said billet is confined within a split die, to endwise pressure sufficient to longitudinally contract said billet, to expand the same laterally midway between the ends and to thereby accumulate sufficient metal in said expanded portion to correspond to the cubical content of the walls of the valve chamber and the body flange of the valve body to be extruded, then effecting the extrusion of the body proper and simultaneously shaping a valve chamber therein together with a terminal apron extending from said body, the cubical content of which apron corresponds to the cubic content of the body flange desired and then upsetting a body flange from said extruded apron.

4. In the method of making a multi-way shape having a central hollow flanged body portion and opposing flanged hub sections projecting therefrom adjacent the lower end thereof, the steps which comprise providing a substantially barrel shaped metal blank having terminal flanges and a central bulge, the total cubical content of said blank being equal to that of the finished shape desired and the length thereof corresponding to the overall length between the outer faces of the hub flanges, and then while said bulge portion is heated to an extrusion temperature and in a plastic condition and while said blank is confined in a die conforming in internal contour to the desired finished shape, extruding the body portion of said shape and simultaneously forming by such extrusion a terminal apron thereon of the same cubical content as the ultimate flange desired upon said body portion and then forming from said apron, by an upsetting operation, an integral body flange.

5. In the method of forming a valve body, the steps which comprise subjecting an elongated metal billet, of the cubical content of the desired valve body, while the central portion is heated to a plastic condition and while said billet is confined within a split die, to endwise pressure sufficient to longitudinally contract said billet and to expand the same laterally to thereby accumulate sufficient metal centrally of the billet to correspond to the cubical content of the walls of the valve chamber and the terminal collar of the valve body to be extruded, then effecting the extrusion of the body proper and simultaneously shaping a valve chamber therein together with a terminal apron extending outwardly from said body, the cubical content of which apron corresponds to the cubic content of the terminal collar desired and then upsetting a terminal collar from said extruded apron.

STANLEY W. SPARKS.